United States Patent [19]

Sugito et al.

[11] Patent Number: 4,481,773
[45] Date of Patent: Nov. 13, 1984

[54] TURBO-SUPERCHARGING SYSTEM FOR INTERNAL COMBUSTION ENGINES

[75] Inventors: Hiroshi Sugito; Tamotsu Kasuya, both of Oyama, Japan

[73] Assignee: Kabushiki Kaisha Komatsu Seisakusho, Tokyo, Japan

[21] Appl. No.: 482,980

[22] Filed: Apr. 7, 1983

[30] Foreign Application Priority Data

Apr. 7, 1982 [JP] Japan .............................. 57-49405[U]

[51] Int. Cl.³ ............................................. F02B 37/00
[52] U.S. Cl. ..................................................... 60/606
[58] Field of Search ......................... 60/606, 611, 612; 123/559, 564

[56] References Cited

U.S. PATENT DOCUMENTS 3,020,901  2/1962  Cook ................................... 123/559
3,370,417  2/1968  Koziara ................................. 60/611
3,396,533  8/1968  Fischer .................................. 60/606

FOREIGN PATENT DOCUMENTS 1228460  11/1966  Fed. Rep. of Germany ........ 60/606
5425907   7/1977  Japan ..................................... 60/606
56-624    4/1982  Japan ..................................... 60/606

Primary Examiner—Michael Koczo
Attorney, Agent, or Firm—Armstrong, Nikaido, Marmelstein & Kubovcik

[57] ABSTRACT

A turbo-supercharging system for an internal combustion engine of a vehicle having an air brake system wherein compressed air is preferentially supplied to the air brake system and surplus air is used for supercharging the engine. The system includes an air compressor driven by the engine, an air reservoir tank for storing compressed air therein and supplying it to a turbine of a turbo-supercharger when required, and a solenoid-operated valve disposed in a conduit interconnecting the air tank and the air compressor. The solenoid-operated valve is normally held in its block position and adapted to be changed over to its communication position when air pressure in the air brake system exceeds a predetermined value.

5 Claims, 1 Drawing Figure

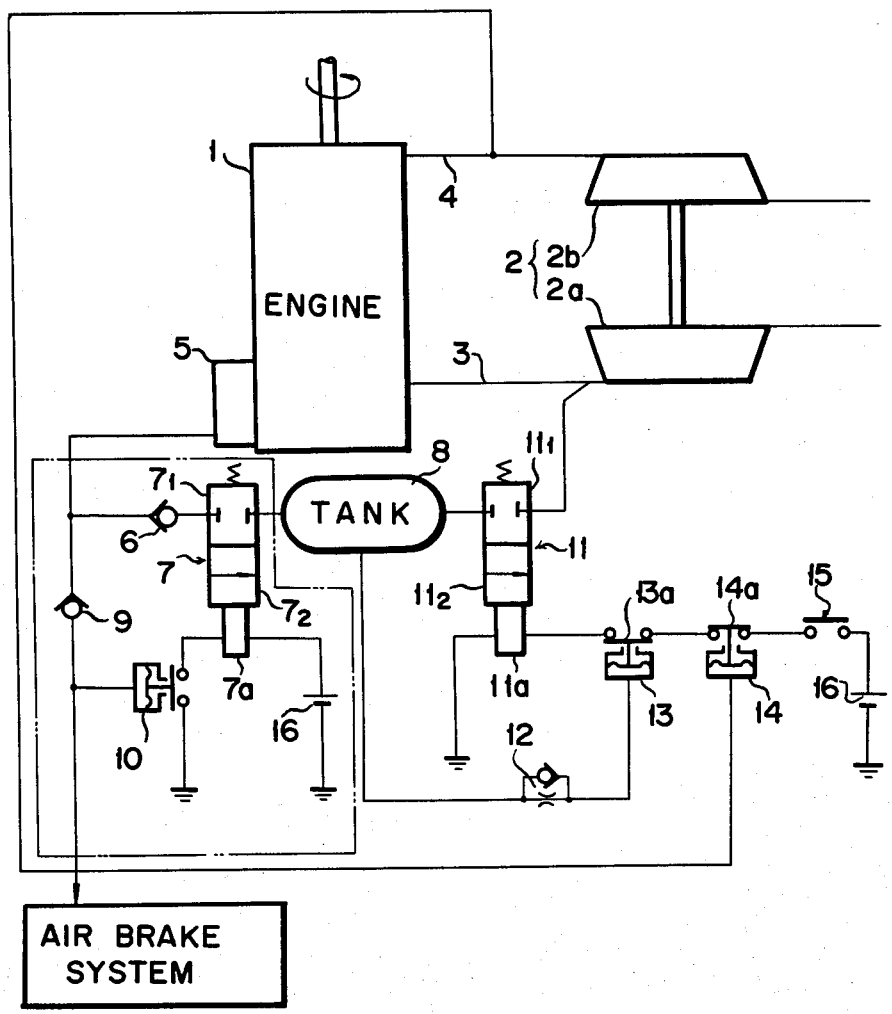

TURBO-SUPERCHARGING SYSTEM FOR INTERNAL COMBUSTION ENGINES

BACKGROUND OF THE INVENTION

This invention relates to a turbo-supercharging system for internal combustion engines with an improved quick acceleration performance.

In general, in case of quickly accelerating a turbo-supercharged engine, the increase in the revolving speed of the turbo-supercharger will lag behind that of the engine, and therefore the amount of air to be drawn into the engine cylinders will become insufficient resulting in reduced acceleration performance of the engine.

SUMMARY OF THE INVENTION

It is therefore an object of the present invention to provide a turbo-supercharging system for an internal combustion engine wherein surplus compressed air for an air brake system can be used for rotating a turbine of a turbo-supercharger while retaining compressed air to be preferentially supplied to the air brake system.

In accordance with an aspect of the present invention, there is provided a turbo-supercharging system for an internal combustion engine of a vehicle having an air brake system, comprising: an engine; a turbo-supercharger including a turbine and a compressor; exhaust pipe means for introducing exhaust gas from said engine into said turbine to thereby rotate said turbine; intake pipe means for introducing compressed air from said compressor into said engine; air compressor means driven by said engine; first conduit means for supplying compressed air from said air compressor means to said air brake system; air tank means for storing compressed air therein; second conduit means for interconnecting said first conduit means and said air tank means; third conduit means for interconnecting said air tank means and said turbine; first solenoid-operated valve means disposed in said second conduit means, said first solenoid-operated valve means having a block position and a communication position and being normally held in the block position and adapted to be changed over to the communication position when air pressure in said air brake system exceeds a predetermined value; and means for detecting the predetermined air pressure in said air brake system, said detecting means being operatively connected with said first solenoid-operated valve means.

The above and other objects, features and advantages of the present invention will be readily apparent from the following description taken in conjunction with the accompanying drawing.

BRIEF DESCRIPTION OF THE DRAWING

Accompanying drawing is a schematic diagram of a turbo-supercharging system according to the present invention.

DESCRIPTION OF THE PREFERRED EMBODIMENT

The present invention will now be described in detail below by way of example only with reference to the accompanying drawing. In the drawing, reference numeral 1 denotes an engine and 2 a turbo-supercharger which comprises a turbine 2a adapted to be driven by the exhaust gas discharged from the engine 1 through an exhaust pipe 3 and a compressor 2b adapted to be driven by the turbine 2a, the air pressurized by the compressor 2b being supercharged through an air inlet pipe 4 into the engine 1. Reference numeral 5 denotes an air compressor adapted to be driven by the above-mentioned engine 1. The air pressurized or compressed by this compressor 5 is accumulated through a check valve 6 and a solenoid-operated valve 7 in an air reservoir tank 8 with part of the compressed air being supplied through a check valve 9 into a brake system. Reference numeral 10 denotes a pressure switch adapted to detect the pressure of the air in the brake system and which is connected through a solenoid 7a of the solenoid-operated valve 7 with a power source 16. When the air pressure in the brake system is lower than a preset pressure, the solenoid-operated valve 7 is allowed to occupy its interrupting position $7_1$ to thereby supply all the air from the compressor 5 into the brake system. Further, when the air pressure in the brake system is higher than the above-mentioned preset value, the solenoid-operated valve 7 is allowed to occupy its communicating position $7_2$ to thereby supply or accumulate part of the compressed air from the compressor 5 into the air reservoir tank 8.

Whilst, connected between the air reservoir tank 8 and the turbine 2a of the turbo-supercharger 2 is a solenoid-operated valve 11 having a solenoid 11a which is connected with a power source 16 through a contact 13a of a pressure switch 13 adapted to detect through a restrictor valve 12 the air pressure in the air reservoir tank 8, a contact 14a of a pressure switch 14 adapted to detect the boost air pressure to be supercharged into the engine 1, and a main switch 15 interlocked with the accelerator pedal or the rack of the fuel pump and adapted to turn on when the engine is under acceleration. When the air pressure in the air reservoir tank 8 is more than a preset value, the boost air pressure is less than a preset value, and the main switch 15 is turned on, the solenoid-operated valve 11 is changed over from the interrupting position $11_1$ to the communicating position $11_2$ so as to supply the air in the air reservoir tank 8 into the turbine 2a of the turbo-supercharger 2 to accelerate the turbo-supercharger 2.

As described in detail hereinabove, according to the present invention, when the engine 1 is accelerated under the condition that the boost pressure to be supplied into the engine 1 is low and the compressed air accumulated in the air reservoir tank 8 is more than the present value, the main switch 15 is turned on in response to the acceleration of the engine 1 to change over the solenoid-operated valve 11 to its communicating position $11_2$ thereby supplying the air in the air reservoir tank 8 into the turbine 2a of the turbo-supercharger 2 thus accelerating the turbine 2a. Therefore, the transient response characteristic of the turbo-supercharger 2 can be improved to enhance the acceleration performance of the engine 1 remarkably, and also when a drop in the air pressure in the brake system occurs, such troubles as the air is consumed on the side of the turbo-supercharger 2 thus reducing the braking effect can be eliminated because there is employed a brake preferential circuit wherein the air is preferentially supplied into the brake system.

What is claimed is:

1. A turbo-supercharging system for an internal combustion engine of a vehicle having an air brake system, comprising:
   an engine;

a turbo-supercharger including a turbine and a compressor;
exhaust pipe means for introducing exhaust gas from said engine into said turbine to thereby rotate said turbine;
intake pipe means for introducing compressed air from said compressor into said engine;
air compressor means driven by said engine;
first conduit means for supplying compressed air from said air compressor means to said air brake system;
air tank means for storing compressed air therein;
second conduit means for interconnecting said first conduit means and said air tank means;
third conduit means for interconnecting said air tank means and said turbine;
first solenoid-operated valve means disposed in said second conduit means, said first solenoid-operated valve means having a block position and a communication position and being normally held in the block position and adapted to be changed over to the communication position when air pressure in said air brake system exceeds a predetermined value; and
means for detecting the predetermined air pressure in said air brake system, said detecting means being operatively connected with said first solenoid-operated valve means.

2. A turbo-supercharging system according to claim 1 wherein said detecting means is a pressure switch.

3. A turbo-supercharging system according to claim 1 further comprising a first check valve disposed in said first conduit means for blocking air flow from said air brake system to said air compressor means and a second check valve disposed in said second conduit means for blocking air flow from said tank means to said air compressor means.

4. A turbo-supercharging system according to claim 1 further comprising second solenoid-operated valve means disposed in said third conduit means, said second solenoid-operated valve means having a block position and a communication position and being normally held in the block position and adapted to be changed over to the communication position when solenoid-operated, and a normally-opened main switch adapted to be closed in response to the acceleration of the engine to thereby change over said second solenoid-operated valve means to its communication position.

5. A turbo-supercharging system according to claim 4 further comprising a normally-opened second pressure switch disposed in a circuit connecting said main switch with said second solenoid-operated valve means, said second pressure switch being adapted to be closed when air pressure in said air tank means exceeds a predetermined value, and a normally-closed third pressure switch disposed in said circuit, said third pressure switch being adapted to be opened when air pressure in said intake pipe means exceeds a predetermined value to thereby change over said second solenoid-operated valve means to its block position.

* * * * *